(No Model.)
H. C. PALMER.
SAW.
No. 379,719. Patented Mar. 20, 1888.
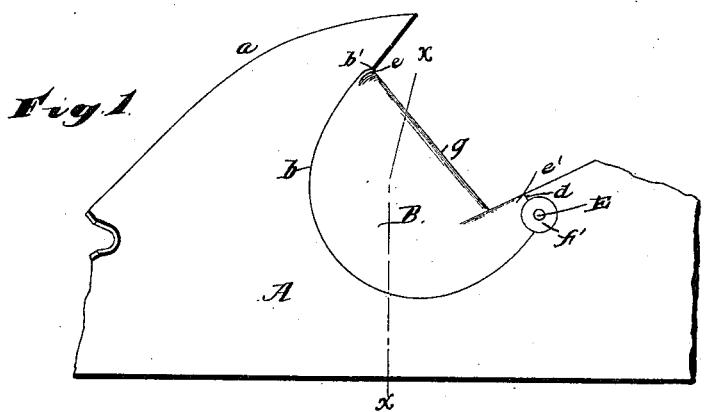
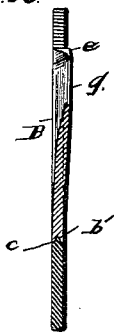 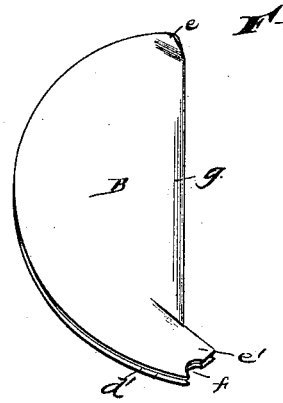
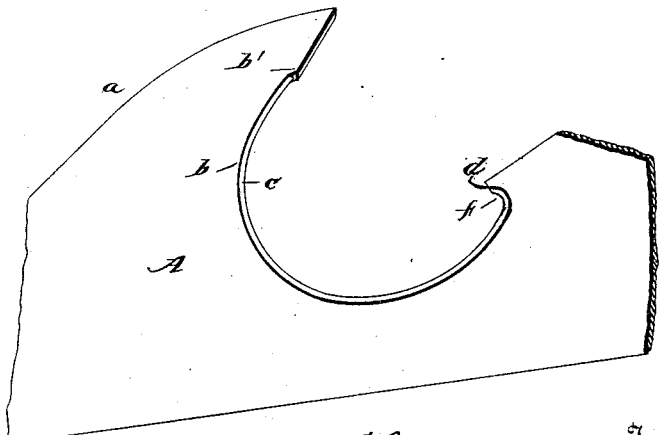
Witnesses
H. C. Palmer, Inventor,
By his Attorneys,

UNITED STATES PATENT OFFICE.

HEZEKIAH C. PALMER, OF BINGEN, ARKANSAS, ASSIGNOR OF ONE-HALF TO WILLIAM G. SCOGGIN, OF SAME PLACE.

SAW.

SPECIFICATION forming part of Letters Patent No. 379,719, dated March 20, 1888.

Application filed March 30, 1887. Renewed January 16, 1888. Serial No. 260,956. (No model.)

*To all whom it may concern:*

Be it known that I, HEZEKIAH C. PALMER, a citizen of the United States, residing at Bingen, in the county of Hempstead and State of Arkansas, have invented new and useful Improvements in Saws, of which the following is a specification.

My invention relates to improvements in saws; and it consists of the peculiar construction and arrangement of the various parts for service, substantially as hereinafter fully set forth, and particularly pointed out in the claims.

The primary object of my invention is to provide a saw with an attachment for planing the wood or other material that is being operated on at the same time that the sawing operation is being carried on, and thereby save the expense of planing the work subsequent to the sawing thereof, which effects a very great economy in the preparation of the raw material for building and other purposes.

A further object of my invention is to provide a planer attachment to saws which can be very easily and readily applied to the saw to adapt it for planing the work, or which can be as easily removed from the saw to permit it to saw the timber without planing it.

My invention is adapted for sawing green as well as dry timber to effect the saving of kiln-drying the timber, and it is very simple and strong in construction and cheap and inexpensive of manufacture.

In the accompanying drawings, which illustrate a saw embodying my invention, Figure 1 is a side elevation of a portion of the saw with my invention applied thereto. Fig. 2 is a transverse sectional view on the line $x\,x$ of Fig. 1. Fig. 3 is a detached view of the insertible planer-tooth, and Fig. 4 is a like view of a portion of the saw with the tooth removed to show the socket for the tooth more clearly.

Referring to the drawings, in which like letters of reference denote corresponding parts in all the figures, A designates a portion of a saw-blade, which may be either in the form of a circular or sash saw, and which is provided with the usual teeth at its periphery, the working sides of which are of peculiar form to provide a socket for the insertible tooth or planer attachment B, hereinafter described.

The outer or rear side of the tooth $a$ of the saw-blade is curved, as is usual, and the under or working side of the tooth $a$ is also curved in substantially a semicircle, as shown. The semicircular edge $b$ of the tooth is provided with a shoulder or ledge, $b'$, near the extremity of the tooth, as shown, and it is further beveled on opposite sides to provide a central rib or ridge, $c$, for a purpose presently described. At the opposite extremity of the semicircular portion of the tooth is provided an abrupt shoulder, $d$, which is arranged in an inclined position with relation to the curved portion $b$ and projects beyond the terminal point thereof for a considerable distance, as shown, the exposed face of the shoulder being inclined or beveled to aid in securely retaining the tooth B in its socket. This tooth B is shown in detail in Fig. 3 of the drawings, and it is made or formed in a single piece of steel. The tooth is made semicircular in form on one of its sides, so that it is adapted to more closely and snugly fit in the semicircular portion of the tooth, and this edge or side of the tooth is provided with a central continuous recess or channel, $d'$, the sides of which are arranged at an angle to each other to adapt the rib on the semicircular portion of the blade to fit snugly and closely therein, and thereby retain the tooth against lateral displacement when it is fitted in the saw to adapt the latter for planing the work, as well as cutting the same.

One of the terminal ends of the semicircular rear edge of the tooth B is provided with a projecting nib, $e$, which is designed to fit very snugly beneath the shoulder $b'$ of the saw-blade, and the other terminal end of the curved edge of the tooth is provided with another projecting lip, $e'$, the exposed face of which is beveled or inclined to adapt it to also fit the similar face of the abrupt shoulder $d$ of the socket in the blade of the saw. It will thus be seen that I provide a saw with a peculiar and novel form of socket for an insertible planer-tooth, which is very securely and firmly held against either lateral displacement or endwise movement, and that the tooth can be very easily fitted or adjusted in place and as readily removed.

E designates a transverse rivet which passes through suitable recesses, $f$, formed in the meeting edges of the saw-blade and the tooth B, near or at the lower outer extremity of the tooth, and this rivet has enlarged heads $f'$, which lie or fit flush with the outer exposed faces of the saw and the tooth, as shown. The edge or side of the tooth opposite to the semi-circular edge of the same is made straight, as shown, and is beveled outwardly, as at $g$. This tooth B is made tapering in form from its semicircular edge to the cutting-edge thereof, so that the tooth is thicker at the cutting-edge, except at the entreme beveled portion, than at its rear curved edge. The purpose of thus tapering the body of the tooth is that its cutting-edge shall project beyond the plane of the side face of the saw adjacent to the work upon which the planer-tooth is designed to work, whereby, when the saw is driven, the teeth $a$ thereof will act upon the work in the usual manner and the planer tooth B will act upon the side of the work to trim and plane the same, to thereby dispense with the subsequent operation of planing the work after leaving the saw.

I attach especial importance to making the planer-tooth B tapering in form from its curved rear edge to the cutting-edge, as by such means I am enabled to fit the rear neutral surface of the planer-tooth flush with the side edges of the saw-blade and to cause one side of the beveled working-edge of the said tooth to project beyond the plane of one of the side faces of the saw adjoining the work, so that the said cutting-edge will act upon the work to plane the same simultaneously with the saw to cut it. Any preferred number of these insertible planer-teeth B can be fitted in the saw for the purpose described; but I have found in practice that two teeth B arranged at diametrically-opposite points in the periphery of the saw, if it be a circular one, will give good results and turn out the work in a very neat and thoroughly-finished state.

By tapering the planer-tooth B transversely, so that its curved neutral edge lies flush with the sides of the saw and its cutting-edge projects beyond one of the faces thereof adjacent the work, the planer-tooth will move or cut through the work very smoothly and without increasing the resistance, thereby enabling the saw to perform the same amount of work in the same period of time when the planer-teeth are fitted therein as well as when they are removed. My improved device can be very easily and readily applied by an unskilled person. It is simple and durable in construction. It is adapted to planing green as well as dry timber, and effects a very large saving in the preparation of the material for building and other purposes, as the material does not have to be passed through a planing-mill to finish the same after it leaves the saw.

Slight changes in the form and proportion of parts can be made without departing from the principle of my invention.

Having thus fully described my invention, what I claim as new, and desire to secure by Letters Patent, is—

1. A saw having a curved socket with the projecting rib $c$ and the shoulders or ledges $d$ $b'$, and a removable transversely-tapered planer having a curved neutral edge with a channel, $d'$, to engage the rib $c$, and provided with shoulders $e\ e'$, to engage the shoulders $b'\ d$, and a beveled cutting edge, substantially as specified.

2. A saw having a curved socket between its teeth provided with the shoulders $b'\ d$, a planer fitted in said socket and provided with shoulders $e\ e'$, to engage the shoulders $b'\ d$, and the fastening-rivet E, passed through a recess, $f$, formed in the meeting edges of the socket and the planer, substantially as described and shown.

In testimony that I claim the foregoing as my own I have hereto affixed my signature in presence of two witnesses.

HEZEKIAH C. PALMER.

Witnesses:
 OLLIE MARTIN,
 W. E. BELLOH.